July 13, 1965   B. C. HOLBEN   3,194,376
LINEAR MOTION DIVERTER MECHANISM FOR CONVEYORS
Original Filed April 20, 1961
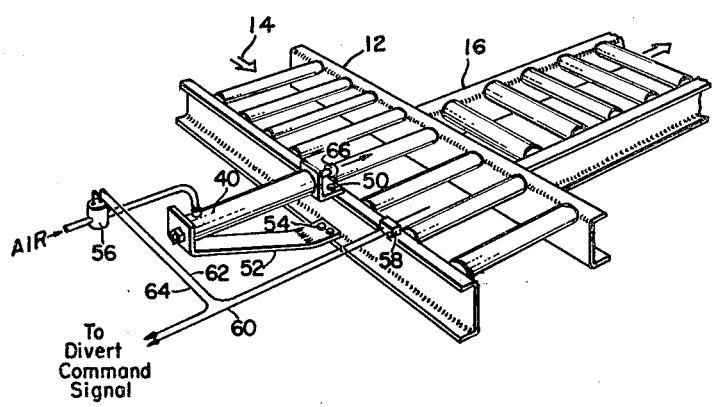
INVENTOR
Bernard C. Holben
S. Henry Peterson
AGENT

United States Patent Office

3,194,376
Patented July 13, 1965

3,194,376
LINEAR MOTION DIVERTER MECHANISM
FOR CONVEYORS
Bernard C. Holben, Dublin Ohio, assignor to Industrial Nucleonics Corporation, a corporation of Ohio
Original application Apr. 20, 1961, Serial No. 104,291, now Patent No. 3,110,383, dated Nov. 12, 1963. Divided and this application Aug. 26, 1963, Serial No. 304,491.
3 Claims. (Cl. 193—36)

This is a division of my copending application Serial No. 104,291, filed April 20, 1961, now Patent No. 3,110,383 and the disclosure thereof is incorporated by reference herein.

The invention relates generally to conveyor systems and more specifically to improved apparatus for diverting articles from one conveyor to another.

In conveyor systems, articles traveling on a main conveyor line must frequently be routed onto other intersecting branch conveyors for purposes of sorting or storage. It may be desired to either divert the articles whereby their direction of travel is altered or to transfer articles from one conveyor to another traveling in the same direction. Whatever the operation, the actuating member must be positive-acting. Reliability and quickness of operation is essential to the successful operation of conveyor systems handling large volumes of traffic. Recently, the trend has been to higher conveyor line speeds approaching 120 feet per minute and a traffic volume approaching thirty or thirty-five units per minute. Slow-acting prior art devices have failed to cope with these high conveyor speeds especially where the traffic density is greater than fifteen units per minute.

The present invention provides a diverter actuated by a pneumatic piston and cylinder pusher type driving device. In this connection, it is appropriate to point out the fact that pneumatic cylinder-actuated pusher type actuators are well known in the conveyor art for transferring articles from one conveyor to another. For examples of such devices, reference may be made to Patent Nos. 2,881,898 and 2,990,965. At least for the present purpose, however, a distinction is made between these prior art devices, herein referred to as "transfer mechanisms," and devices in the category of the present invention which are referred to as "diverters." For an example of a diverter, reference can be made to my copending application Serial No. 795,782, filed February 26, 1959, now U.S. Patent No. 2,986,264.

Insofar as it affects the present invention, one of the essential requirements of the diverter is that when switching an article from one conveyor to another, the orientation of the article with respect to its line of travel must not be changed; that is to say, the article must always proceed "head first" throughout its entire tortuous path through the conveyor network. Hence it is the function of the diverter to sort or steer the article so that first its front end and then its rear end generally swings in an arcuate path off of the main conveyor and onto the branch conveyor.

In contradistinction to this desired arcuate movement, the piston and cylinder driving device inherently generates straight-line motion. No particular problem arises in the application of this device to an ordinary pusher type transfer mechanism, which is permitted to engage the article with a wide, flat shoe and simply shove the article broadside off the conveyor. However, it is believed that the piston and cylinder pusher type device has not been heretofore applied to diverters, except in combination with rather complex and expensive articulated and curvilinear structures.

In accordance with this invention, I have found that a piston and cylinder type actuator can be employed in a diverter mechanism which is not only effective and reliable, but remarkably simple and inexpensive. This mechanism consists of an ordinary commercial piston and cylinder having the usual axial push rod, and wherein the push rod is tipped with an article engaging member which is preferably ball-shaped on the end to provide a sphercial article-contacting surface. The tip member is quite small in dimensions compared with the article to be diverted, and when it is driven against the rigid side of a passing article such as a mail tray, it provides a sort of rolling pivot around which the tray is turned into its diverted path along the receiving conveyor.

Contributing significantly to the simplicity and economy of constructing the device is the fact that the article contacting surface of the tip is a figure of revolution around the axis of the push rod, and accordingly the push rod and/or the tip is not required to be indexed to prevent rotation with respect to the drive cylinder. This saves the cost and maintenance of a system of auxiliary guide rods or channels and the associated carriage arrangement which is commonly provided in conventional pusher transfer mechanism to maintain the proper angular alignment of the article-contacting shoes used thereon.

Accordingly, it is a primary object of the present invention to provide an improved article diverter for rapid conveyor systems.

It is another object of the present invention to provide an article diverter that is quick and reliable in operation.

It is still another object of the present invention to provide an article diverter that is simpler to construct and more economical to maintain in satisfactory working order than similar devices used heretofore.

These and other advantages of the present invention will become more apparent from the following description, taken in conjunction with the appended drawing in which:

The single figure is a perspective view of a diverter constructed in accordance with the present invention.

Referring to the drawing, a section of a typical roller conveyor system is shown. A main conveyor 12 is adapted to transport articles (not shown) such as mail trays in the direction indicated by the arrow 14. One branch conveyor 16 is shown intersecting the main conveyor at a right angle.

According to the present invention, an air cylinder 40 is mounted on the side of the main conveyor. An angle bracket 50 is fastened to the upper side ledge of the main conveyor 12 and serves to mount the forward end of the air cylinder 40. A supporting bracket 52 is fastened to the lower side ledge as at 54 and bent to extend upwardly so as to brace the rear of the air cylinder.

An electrically-operated solenoid valve 56 is used to control the flow of compressed air from a source (not shown) into the cylinder 40 to effect extension of the piston rod thereof when the air pressure is applied, and to exhaust air from the cylinder so that the piston rod may be retracted by an internal spring (not shown) when the air pressure is relieved. A tray position-sensing switch 58 is mounted downstream from the pusher element and connected to both the solenoid 56 and to a divert command signal device (not shown) by means of electrical conductors 60–64.

The piston rod, which is normally retracted, is tipped by a ball-shaped article engaging member 66 which provides a small, spherical surface for contacting the tray. Since the ball tip is a figure of revolution around the axis of the cylinder and push rod, any accidental or other rotation of the piston, the rod, or the tip with respect to the cylinder does not affect or alter the proper pivotal engagement of the article contacting surface with the tray. Hence no auxiliary guide means is required.

When a tray to be diverted is located at the intersection the switch 58 is actuated and tip member 66 is extended to engage the side of the tray. Upon completion of the diverting function the rod is automatically returned by means of the above-mentioned spring or, alternatively, in the case of a double-acting cylinder which may be used, by automatic air flow reversing means. Trays passing the intersection which are not to be diverted will actuate the switch 58 but the solenoid 56 will not energize due to the absence of a divert command signal on lines 60, 64.

While the present invention has been described in terms of specific apparatus, this construction should not be in any way interpreted as limiting the invention. Inasmuch as numerous modifications, additions, omissions and substitutions may be made to the illustrated embodiment without detracting from the original spirit and scope of the invention, the only restrictions being those clearly imposed by the following claims:

What is claimed is:

1. In a conveyor system wherein a main conveyor bearing articles to be distributed is intersected from one side by a branch conveyor, an article diverter mounted above said main conveyor on the side thereof opposite said branch conveyor, said diverter comprising a pneumatic piston and cylinder driving device having a push rod which carries on the end thereof an article-engaging member with a spherically shaped surface for contacting said articles, and means connected to said diverter for delivering compressed air thereto for actuating the same.

2. In a conveyor system wherein a main conveyor bearing articles to be distributed is intersected from one side by a branch conveyor, an article diverter mounted above said main conveyor on the side thereof opposite said branch conveyor, said diverter comprising a pneumatic piston and cylinder driving device having a push rod which carries on the end thereof an article-engaging member with a spherically shaped surface for contacting said articles, means connected to said diverter for delivering compressed air thereto for actuating the same, said air delivery means comprising a source of air under pressure, a control valve interconnecting said driving device and said source, and switch means mounted downstream of said diverter on said main conveyor for operating said control valve when one of said articles to be diverted arrives at a selected position alongside said diverter.

3. In a conveyor system wherein a main conveyor bearing articles to be distributed is intersected from one side by a branch conveyor, an article diverter mounted above said main conveyor on the side thereof opposite said branch conveyor, said diverter comprising a pneumatic piston and cylinder driving device having a push rod which carries on the end thereof an article-engaging member which is of relatively small size in comparison with the size of said articles, said member having an article-contacting surface for engaging said articles, said surface constituting a surface of revolution around the axis of said push rod, and means connected to said diverter for delivering fluid under pressure thereto for actuating the same, said fluid delivery means comprising a source of fluid under pressure, a control valve interconnecting said driving device and said source, and switch means mounted downstream of said diverter on said main conveyor for operating said control valve when one of said articles to be diverted arrives at a selected position alongside said diverter.

No references cited.

SAMUEL F. COLEMAN, *Primary Examiner.*